United States Patent
Li et al.

(10) Patent No.: US 11,568,266 B2
(45) Date of Patent: Jan. 31, 2023

(54) SYSTEMS AND METHODS FOR MUTUAL LEARNING FOR TOPIC DISCOVERY AND WORD EMBEDDING

(71) Applicant: Baidu USA, LLC, Sunnyvale, CA (US)

(72) Inventors: Dingcheng Li, Sammamish, WA (US); Jingyuan Zhang, San Jose, CA (US); Ping Li, Bellevue, WA (US)

(73) Assignee: Baidu USA LLC, Sunnyvale, CA (US)

(*) Notice: Subject to any disclaimer, the term of this patent is extended or adjusted under 35 U.S.C. 154(b) by 513 days.

(21) Appl. No.: 16/355,622

(22) Filed: Mar. 15, 2019

(65) Prior Publication Data
US 2020/0293902 A1 Sep. 17, 2020

(51) Int. Cl.
| G06N 20/00 | (2019.01) |
| G06N 3/08 | (2006.01) |
| G06F 17/18 | (2006.01) |
| G06F 17/16 | (2006.01) |

(52) U.S. Cl.
CPC .......... *G06N 3/088* (2013.01); *G06F 17/16* (2013.01); *G06F 17/18* (2013.01); *G06N 3/084* (2013.01); *G06N 20/00* (2019.01)

(58) Field of Classification Search
CPC ......... G06N 3/088; G06N 20/00; G06N 3/084
See application file for complete search history.

(56) References Cited

PUBLICATIONS

Shaohua Li and Tat-Seng Chua and Jun Zhu and Chunyan Miao (2016). Generative Topic Embedding: a Continuous Representation of Documents (Extended Version with Proofs). CoRR, abs/1606.02979. (Year: 2016).*

Amiri, H. (2016). Learning Text Pair Similarity with Context-sensitive Autoencoders. In Proceedings of the 54th Annual Meeting of the Association for Computational Linguistics (vol. 1: Long Papers) (pp. 1882-1892). Association for Computational Linguistics. (Year: 2016).*

Yu Chen, & Mohammed J. Zaki. (2017). KATE: K-Competitive Autoencoder for Text. (Year: 2017).*

(Continued)

*Primary Examiner* — Kakali Chaki
*Assistant Examiner* — Johnathan R Germick
(74) *Attorney, Agent, or Firm* — North Weber & Baugh LLP

(57) ABSTRACT

Described herein are embodiments for systems and methods for mutual machine learning with global topic discovery and local word embedding. Both topic modeling and word embedding map documents onto a low-dimensional space, with the former clustering words into a global topic space and the latter mapping word into a local continuous embedding space. Embodiments of Topic Modeling and Sparse Autoencoder (TMSA) framework unify these two complementary patterns by constructing a mutual learning mechanism between word co-occurrence based topic modeling and autoencoder. In embodiments, word topics generated with topic modeling are passed into auto-encoder to impose topic sparsity for the autoencoder to learn topic-relevant word representations. In return, word embedding learned by auto-encoder is sent back to topic modeling to improve the quality of topic generations. Performance evaluation on various datasets demonstrates the effectiveness of the disclosed TMSA framework in discovering topics and embedding words.

20 Claims, 6 Drawing Sheets

(56) References Cited

PUBLICATIONS

Xun, G., Li, Y., Gao, J., & Zhang, A. (2017). Collaboratively Improving Topic Discovery and Word Embeddings by Coordinating Global and Local Contexts. In Proceedings of the 23rd ACM SIGKDD International Conference on Knowledge Discovery and Data Mining (pp. 535-543). (Year: 2017).*

Z. Gong, Y. Fu, X. Su and H. Xu, "Deep Variation Autoencoder with Topic Information for Text Similarity," 2018 3rd International Conference on Computational Intelligence and Applications (ICCIA), 2018, pp. 265-269, doi: 10.1109/ICCIA.2018.00058. (Year: 2018).*

Chao Wei, Senlin Luo, Limin Pan, Zhouting Wu, Ji Zhang, & Qamas Gul Khan Safi (2018). Locally weighted embedding topic modeling by markov random walk structure approximation and sparse regularization. Neurocomputing, 285, 35-50. (Year: 2018).*

Ruan Z., Su J., Xiong D., Ji R. (2018) Context-Aware Phrase Representation for Statistical Machine Translation. In: Geng X., Kang BH. (eds) PRICAI 2018: Trends in Artificial Intelligence. PRICAI 2018. Lecture Notes in Computer Science, vol. 11012. Springer, Cham. (Year: 2018).*

Moody, C.. (2016). Mixing Dirichlet Topic Models and Word Embeddings to Make lda2vec. arXiv.org (Year: 2016).*

Lebret et al.,"Rehabilitation of count-based models for word vector representations," arXiv preprint arXiv:1412.493, 2015. (9pgs).

Levy et al.,"Linguistic regularities in sparse and explicit word representations," Proc. of the 18th Conf. on Computational Language Learning, pp. 171-180, 2014. (10pgs).

Levy et al.,"Neural word embedding as implicit matrix factorization," In NIPS Proceedings, 2014. (9 pgs).

Levy et al.,"Improving distributional similarity with lessons learned from word embeddings," TACL, 3:211-225, 2015. (16 pgs).

Li et al.,"Mapping Client Messages to a Unified Data Modelwith Mixture Feature Embedding ConvolutionalNeural Network," In 2017 IEEE Intr. Conf. on Bioinformatics, 2017. (6pgs).

Li et al.,"Representation learning for question classification via topic sparse autoencoder and entity embedding," IEEE Big Data, 2018. (8 pgs).

Li et al.,"Generative Topic Embedding: a Continuous Representation of Documents (Extended Version with Proofs)," arXiv preprint arXiv:1606.02979, 2016. (13pgs).

Liu et al.,"Topical Word Embeddings" In Proceedings of the Twenty-Ninth AAAI Conference on Artificial Intelligence, pp. 2418-2424, 2015. ( 7pgs).

Luong et al.,"Better word representations with recursive neural networks for morphology," In Proc of the 17th Conf. on Computational Language Learning, CoNLL 2013. (10pgs).

Mikolov et al.,"Distributed representations of words and phrases and their compositionality," arXiv preprint arXiv: 1310.4546, 2013. (9pgs).

Xun et al.,"A correlated topic model using word embeddings," Proc. of the 26th Inter. Joint Conf. on Artificial Intelligence (IJCAI), 2017. (7pgs).

Zhao et al.,"Inter and Intra Topic Structure Learning with Word Embeddings," In Proc. of the 35th Intr. Conf. on Machine Learning (ICML), 2018. (10pgs).

Agirre et al.,"A study on similarity and relatedness using distributional and wordnet-based approaches," Human Language Technologies: The 2009 Annual Conference of the North American Chapter of the ACL, pp. 19-27, 2009. (9pgs).

Bengio et al.,"A Neural Probabilistic Language Model," Journal of Machine Learning Research 3:1137-1155, 2003. (19pgs).

Bengio et al.,"Greedy Layer-Wise Training of Deep Networks," Proceedings of the 20th Annual Conf. on Neural Information Processing Systems, 2006. (8pgs).

Blei et al.,"Latent Dirichlet Allocation," Journal of Machine Learning Research 3:993-1022, 2003. (30pgs).

Collobert et al.,"Natural Language Processing (Almost) from Scratch," Journal of Machine Learning Research 12: 2493-2537, 2011. (45pgs).

Das et al.,"Gaussian LDA for Topic Models withWord Embeddings," Proc. of the 53rd Annual Meeting of the Association for Computational Linguistics and the 7th Intr. Joint Conf. on Natural Language Processing, pp. 795-804, 2015. (10pgs).

Hill et al.,"SimLex-999: Evaluating Semantic Models With (Genuine) Similarity Estimation," Association for Computational Linguistics, 41(4):665-695, 2015. (31 pgs).

Le et al.,"Distributed Representations of Sentences and Documents," arXiv preprint arXiv:1405.4053, 2014. (9pgs).

Mnih et al.,"Three new graphical models for statistical language modelling," In International conference on Machine learning (ACM), 2007. (8pgs).

Quoc et al.,"Improving topic models with latent feature word representations," arXiv preprint arXiv:1810.06306, 2018. (15 pgs).

Pennington et al.,"Gio Ve: Global vectors for word representation," In Proc. of the 2014 conf. on empirical methods in natural language processing (EMNLP), 2014. (pp. 12).

Radinsky et al.,"A word at a time: computing word relatedness using temporal semantic analysis," In Proc. of the 20th Intr. Conf. on World Wide Web (WWW), 2011. (10pgs).

Shi et al.,"Jointly learning word embeddings and latent topics," arXiv preprint arXiv:1706.07276, 2017. (10pgs).

Souvannavong et al.,"Improved video content indexing by multiple latent semantic analysis," In Image & Video Retrieval: 3rd Intr. Conf. (CIVR), 2004. ( 8pgs).

Teh et al.,"Sharing clusters among related groups: Hierarchical dirichlet processes," In Advances in Neural Information Processing Systems (NIPS), 2004. (8pgs).

Vincent et al.,"Extracting and composing robust features with denoising autoencoders," In Machine Learning, Proc. of the 25th Inter. Conf. (ICML), 2008. (8pgs).

Xun et al.,"Collaboratively improving topic discovery and word embeddings by coordinating global and local contexts," In Proc. of the 23rd ACM SIGKDD Inter. Conf. on Knowledge Discovery & Data Mining, 2017. (9pgs).

* cited by examiner

SYSTEMS AND METHODS FOR MUTUAL LEARNING FOR TOPIC DISCOVERY AND WORD EMBEDDING

BACKGROUND

A. Technical Field

The present disclosure relates generally to systems and methods for machine learning. More particularly, the present disclosure relates to systems and methods for mutual machine learning with global topic discovery and local word embedding.

B. Background

Both topic models and word embedding models play significant roles in modeling human languages and have become indispensable tools for natural language processing. Various topic modeling models have successfully revealed the thematic structure of collection of documents with exploring the patterns represented by word co-occurrence matrix. The advantage of topic modeling is its global clustering capacity across documents. When the corpus is large enough, semantic relatedness and coherent topics can be exposed without supervision. In contrast, word embedding models have been proved to be an effective approach to transform sparse discrete words into dense and low-dimensional continuous vectors. Since word embedding usually utilizes local word collocation patterns to construct an embedding link function, the semantic and syntactic relatedness represented is also more local, compared to topic modeling.

Accordingly, what is needed are systems and methods that can combine their respective advantages for further improved performance in natural language processing.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
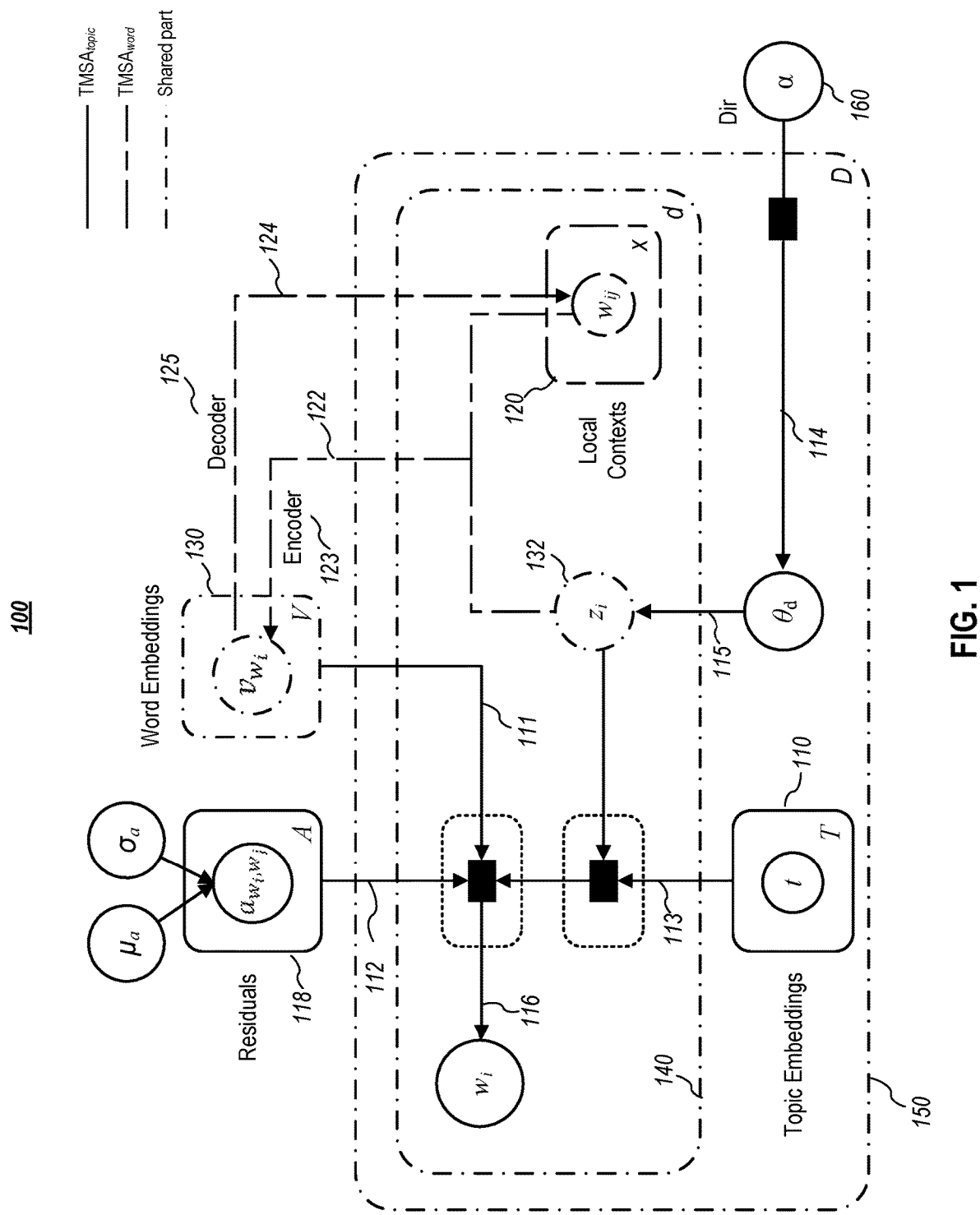
FIG. 1 graphically depicts a Topic Modeling and Sparse Autoencoder (TMSA) framework, according to one or more embodiments of the present disclosure. In the depicted embodiments in FIG. 1, the part in solid lines is about the topic learning process via the $TMSA_{topic}$ component, the part in long-dash-short-dash pattern is about the word embedding via the $TMSA_{word}$ component, and the part in dash-dot pattern is shared by both components for the mutual learning procedure.

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. INTRODUCTION

Both topic models and word embedding models play significant roles in modeling human languages and have become indispensable tools for natural language processing. In the past decade, topic modeling, such as Probabilistic Latent Semantic Analysis (PLSA) or Latent Dirichlet Allocations (LDA), has successfully revealed the thematic structure of collection of documents with exploring the patterns represented by word co-occurrence matrix. The advantage of topic modeling is its global clustering capacity across documents. When the corpus is large enough, semantic relatedness and coherent topics can be exposed without supervision. In contrast, word embedding models have been proved to be an effective approach to transform sparse discrete words into dense and low-dimensional continuous vectors. Since word embedding usually utilizes local word collocation patterns to construct an embedding link function, the semantic and syntactic relatedness represented is also more local, compared to topic modeling.

As these two models complement each other in language modeling, it is therefore motivating to pursue constructing an integrated model which can make full use of their respective advantages. Two common characteristics for topic modeling and word embedding are the nature of dimensionality deduction and their semantic relatedness. Some works have used word embeddings to improve topic modeling. Collaborative Language Model (CLM) (Guangxu Xun, et al., Collaboratively improving topic discovery and word embeddings by coordinating global and local contexts. In *Proceedings of the 23rd ACM SIGKDD International Conference on Knowledge Discovery and Data Mining*, Halifax, NS, Canada, Aug. 13-17, 2017, pages 535-543, 2017) and STE (Bei Shi, et al., Jointly learning word embeddings and latent topics. In *Proceedings of the 40th International ACM SIGIR Conference on Research and Development in Information Retrieval*, Shinjuku, Tokyo, Japan, Aug. 7-11, 2017, pages 375-384, 2017) have been proposed to combine topic modeling and word embedding. CLM applies nonnegative matrix factorization to both topic modeling and word embedding. STE employs skip-gram to learn different topic-specific word embeddings to avoid polysemy. These existing methods, however, do not explicitly consider the mutual influence of global topics and local contexts in the learning process. Thus, the interaction between global topics and local contexts may not be fully explored to boost the performance.

In this patent document, embodiments of a unified TMSA framework are disclosed to explicitly incorporate the mutual influence of global topics and local contexts into a learning process. In TMSA framework embodiments, the influence of local word embeddings are integrated into the discovery of topics via the $\text{TMSA}_{topic}$ component named as topic modeling boosted with sparse autoencoder. The semantic information of word embedding helps $\text{TMSA}_{topic}$ learn topics in an effective way. In one or more embodiments, the topics learned from $\text{TMSA}_{topic}$ are further integrated into the word embedding process via the $\text{TMSA}_{word}$ component named as sparse autoencoder sparsified with topic modeling. Both topics and contexts may be reflected in the learned embeddings of words. The full architecture of the TMSA framework is shown in FIG. 1, according to one or more embodiments of the present disclosure, and is described in detail in Section D. With the mutual learning scheme, TMSA has the following advantages. First, parameter tuning and inferences may be done in a unified framework. Second, the mechanism of back propagation in sparse autoencoder may be utilized for fine tuning word embeddings. Third, extra layers may be easily added to handle other tasks, such as adding a softmax layer for classifications.

In summary, some key contributions of the present patent document are as follows:
  Embodiments of a unified TMSA framework are disclosed to improve topic discovery and word embedding simultaneously via a mutual learning mechanism.
  Embodiments of an efficient algorithm are introduced to boost topic learning by taking advantage of local context information from semantic word embedding.
  Embodiments of a unique topic based sparse autoencoder are designed to improve the word representation learning by encoding both global topics and local context information into the learned embeddings.
  The effectiveness of TMSA embodiments are demonstrated by comparing them with several state-of-the-art methods on both topic modeling tasks and word embedding tasks.

B. SOME RELATED WORK

Some related works in various aspects are summarized in this Section. As it is discussed in the Introduction Section, the main theme of this patent document is to coordinate global topics and local contexts for better topic discovery and word embeddings. Therefore, most relevant works involve topic modeling and word embedding learning Topic Modeling and its Variations Topic modeling is a powerful unsupervised tool to discover latent semantic structure from a text corpus. The most representative model is the Latent Dirichlet Allocation (LDA) (David M. Blei, et al., Latent Dirichlet Allocation. *Journal of Machine Learning Research*, 3:993-1022, 2003). Typically, only a small number of topics are present in each document and only a small number of words have high probability in each topic. This pattern is motivated to deploy Dirichlet priors to regularize the topic distributions. Semantic centroids have the same nature as topics in LDA. The semantic relatedness exists in continuous embedding space while the topic related words exist in discrete space. This similarity leads explorations in common semantic centroids. For example, Nguyen et al. (Improving topic models with latent feature word representations. *TACL*, 3:299-313, 2015) proposed to improve topic models with latent feature word representations (Latent Feature Topic Modeling or LFTM for short). Specifically, they replace the topic-to-word Dirichlet multinomial component that generates words from topics with a two-component mixture of a topic-to-word Dirichlet multinomial component and a latent feature component. The latent feature component is a product of two matrices, pre-trained word embedding and updated topic embedding. In contrast, topic embedding, as topics in LDA, catches global context information while reflecting semantic centroids.

Word Embedding

Current word embedding related works are usually based on neural probabilistic language model introduced by Yoshua Bengio et al. (A neural probabilistic language model. *Journal of Machine Learning Research*, 3:1137-1155, 2003). It has been proven to be able to capture semantic regularities in language by learning context information represented with the local word co-occurrences. Later, Mnih and Hinton (Three new graphical models for statistical language modelling. In *International conference on Machine learning*, pages 641-648. ACM, 2007) proposed three different embedding functions to model the conditional distribution of a word given its context (or vice versa). However, these methods are not scalable on large corpora due to the interaction matrices between the embeddings. Mikolov et al. (In *Advances in Neural Information Processing Systems* 26: 27th Annual Conference on Neural Information Processing Systems 2013. Proceedings of a meeting held Dec. 5-8, 2013, Lake Tahoe, Nev., United States, pages 3111-3119, 2013) proposed Skip-Gram and Continuous Bag Of Words (CBOW) to improve the efficiency of word embeddings via direct interaction between two embeddings, which can be efficiently trained on large corpora and achieve good performance on various linguistic tasks. In particular, the skip-gram with negative sampling for training word embedding is discovered to implicitly factorize the point-wise mutual information matrix of the local word co-occurrence patterns.

Integrated Framework

Besides above work, Topic Word Embedding (TWE) (Yang Liu, et al., Topical word embeddings. In Proceedings of the Twenty *Ninth AAAI Conference on Artificial Intelligence*, Jan. 25-30, 2015, Austin, Tex., USA, pages 2418-2424, 2015) has been proposed to concatenate topic embedding with word embedding to form topical word embedding for each word. Li et al. (Generative topic embedding: a continuous representation of documents. In *Proceedings of the 54th Annual Meeting of the Association for Computational Linguistics, ACL* 2016, Aug. 7-12, 2016, Berlin, Germany, Volume 1: *Long Papers,* 2016) extended LDA to a model named as TopicVec. The extension partially follows LFTM by defining the probability function as a mixture of the conventional multinomial distribution and a link function between the embeddings of the focus words and topics. Furthermore, TopicVec treats pre-trained topic labels as special words and learns embeddings for topics by including the topic labels in the neural architecture. Another work along this line is Gaussian LDA. It uses pre-trained word embeddings learned from large external corpora such as Wikipedia and then models topics with Gaussian distributions in the word embedding space. In addition, Skip-gram Topical word Embedding (STE) was proposed to learn different topic-specific word embeddings to avoid the problem of polysemy. Recently, some models construct informative and asymmetric Dirichlet priors with word embeddings as external knowledge. All of them somewhat make efforts to construct a channel between topic modeling and word embedding. Namely, they do not take into considerations much of the mutual influence of global topics and local contexts explicitly during the learning process.

However, these composite models combine topic models and word embeddings in a separate and heuristic manner. Various researches, such as Collaborative Language Model (CLM) and Correlated Topic Modeling Using Word Embeddings (Guangxu Xun, et al., A Correlated Topic Model Using Word Embeddings. In *Proceedings of the Twenty-Sixth International Joint Conference on Artificial Intelligence, IJCAI* 2017, Melbourne, Australia, Aug. 19-25, 2017, pages 4207-4213, 2017), attempt to integrate both aspects into a framework. CLM was proposed to formulate the topic modeling and word embedding into a co-factorization fashion. It employs non-negative matrix factorization (NMF) to obtain global topic matrix and utilizes the shifted positive point-wise mutual information matrix to generate word embedding vectors. The second one extends Gaussian LDA by modeling topic correlations with the help of word embeddings. Meanwhile, as their topic discovery process starts from learning the word embedding with semantic regularities, the model constructs a mutual learning mechanism. Yet these models are to some degree constructed with topic modeling as the dominant so that word embedding plays less important roles. In contrast, TMSA embodiments presented in this patent document aim at launching a mutual learning mechanism, explicitly enhancing the interactions of global topics and local contexts via two tightly correlated components $TMSA_{topic}$ and $TMSA_{word}$.

C. PROBLEM STATEMENT

Given a set of documents, the document-word matrix D represents the global context information. The topics for documents will be effectively discovered via the proposed topic modeling module $TMSA_{topic}$ by explicitly taking the word embedding information from local contexts into consideration. The local context information is represented by the word co-occurrence matrix X, which is extracted from a sequence of words in documents within a text window. In one or more embodiments, the text window is fixed and remains the same across documents. Each word sequence has a focus word and its neighboring context words within a text window centered at the focus word. $x_{ij} \in X$ records the times a word $w_j$ appears in a word $w_i$'s contexts. The word embeddings will be learned from X via the proposed $TMSA_{word}$ by incorporating the discovered topics into the embedding process. In accordance, word embedding learning and topics discovery form a mutual interactive cycle and continue till convergence.

D. EMBODIMENTS OF TMSA METHODOLOGY

FIG. 1 graphically depicts a TMSA framework, according to one or more embodiments of the present disclosure. As is shown in FIG. 1, the TMSA framework 100 comprises two components, the topic modeling module $TMSA_{topic}$ with a topic embedding matrix V 110, a residual matrix A 118, a Dirichlet prior α 160 (as well as processes 111~116) in the figure and the word embedding module $TMSA_{word}$ with a word co-occurrence matrix X 120, an encoder 123 and a decoder 125 (as well as processes 122 and 124) in the figure. These two components closely interact with each other through the mutual learning mechanism with the shared part (e.g., topic $z_i$ 132 and word embedding matrix V 130) in the figure. These components are elaborated in the following descriptions.

1. Embodiments of Topic Modeling Boosted with Sparse Autoencoder

In one or more embodiments, the disclosed topic modeling module, $TMSA_{topic}$, as shown in FIG. 1, implements a generative process with word embeddings, topic embeddings and residuals for regularization. $TMSA_{topic}$, similar to LDA, represents each document d 140 from a corpus or a document set D 160 as a probability distribution over topics, where each topic is modeled by a probability distribution over words in a fixed vocabulary. With the text corpus, the topics discovered may reflect the global semantic relatedness. The probability of a word is governed by such latent topics. $TMSA_{topic}$ is also a generative model. In one or more embodiments, besides employing Dirichlet prior to generate document topic distributions, normal distributions are utilized to regulate the generations of topic embedding.

Figure 2:
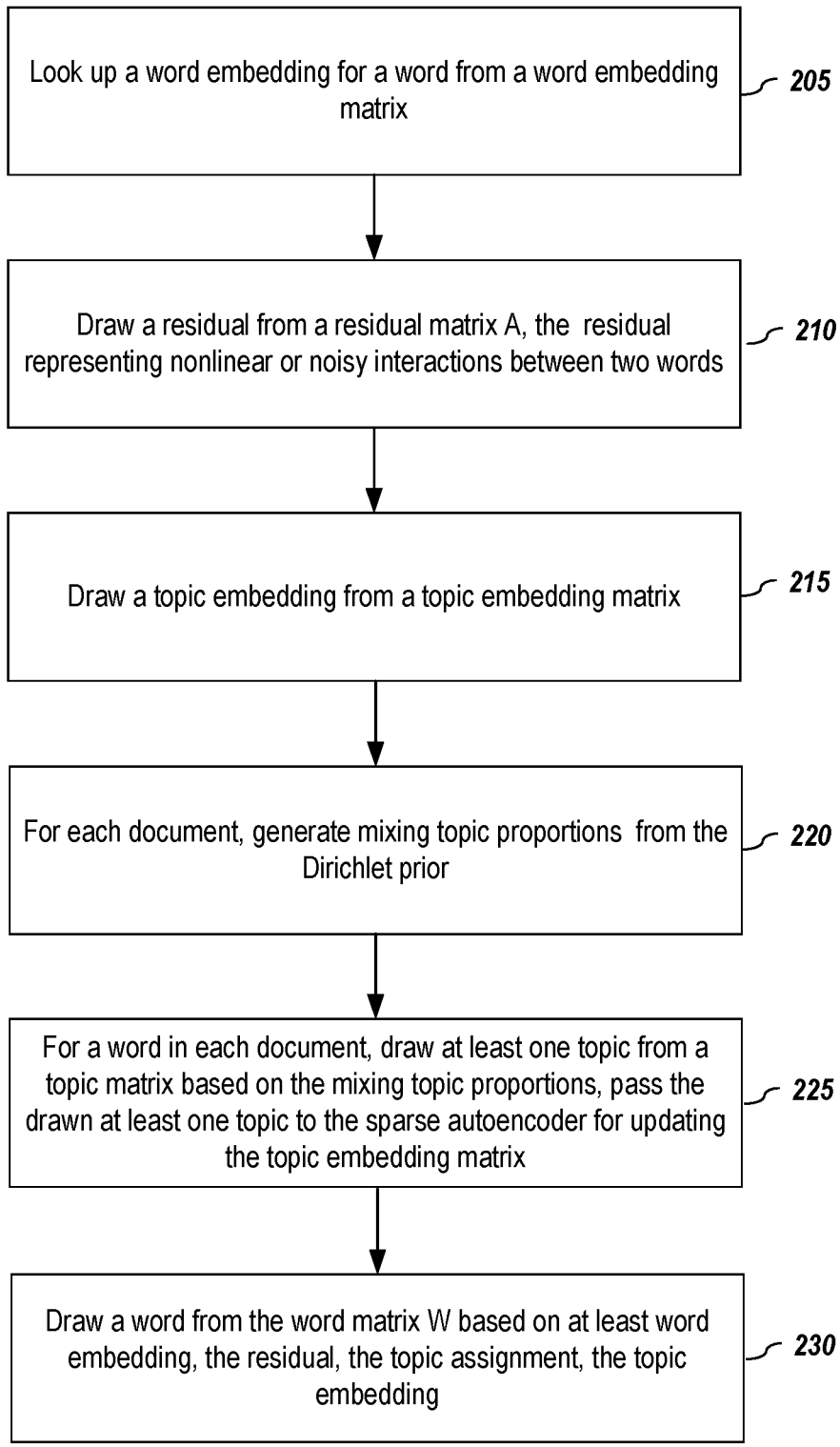
FIG. 2 depicts a method for topic modeling boosted with sparse autoencoder, according to one or more embodiments of the present disclosure.

In one or more embodiments, the generative process and likelihood are defined in FIG. 2 with steps showing as follows:

For each word, look up (205) the word embedding $v_{w_i}$ from the word embedding matrix, V. In one or more embodiments, this step may correspond to process 111 shown in FIG. 1. In one or more embodiments, the word embedding matrix V is updated using an encoder sparsified with topics to reflect topic distribution of words For each word co-occurrence of $w_i$ and $w_j$, draw (210) the residual $a_{w_i,w_j}$ from $\mathcal{N}$ $$\left(0, \frac{1}{2g(\tilde{p}(w_i, w_j))}\right).$$

In one or more embodiments, this step may correspond to process 112 shown in FIG. 1.

For the k-th topic, draw (215) a topic embedding from a topic embedding matrix T 110, which may be represented as a hyperball of radius $\gamma$, as $t_k \sim \text{Unif}(\beta_\gamma)$. In one or more embodiments, the topic embedding is drawn uniformly from the from topic embedding matrix T. In one or more embodiments, this step may correspond to process 113 shown in FIG. 1.

For each document $d_i$;

(a) Generating (220) a mixing topic proportion $\theta_i$ for the document $d_i$ from the Dirichlet prior $\text{Dir}(\alpha)$. In one or more embodiments, this step may correspond to process 114 shown in FIG. 1. The mixing topic proportion represents relative proportions among topics for each document.

(b) For the j-th word:
  i. Draw (225) at least one topic $z_{ij}$ from a topic matrix Z based on the $\theta_i$. In one or more embodiments, this step may correspond to process 115 shown in FIG. 1. In one or more embodiments, the at least one topic $z_{ij}$ drawn for the j-th word is passed to the sparse autoencoder for updating the topic embedding matrix.
  ii. Draw (230) word $w_{ij}$ from a fixed vocabulary W based on at least word embedding $v_{w_i}$, the residual $a_{w_i,w_j}$, the topic assignment $z_{ij}$, the topic embedding $t_k$, according to $p(w_{ij}|w_{i,j-c}:w_{i,j-1},z_{ij},d_i)$. In one or more embodiments, this step may correspond to process 116 shown in FIG. 1.

In one or more embodiments, the Dirichlet prior $\text{Dir}(\alpha)$ may also be updated by the at least one topic $z_{ij}$ drawn for the j-th word. In one or more embodiments, in this generative process, the word embedding matrix, V is updated in the $\text{TMSA}_{word}$ module. The residual $a_{w_i,w_j}$ is a regulation of bigram $w_i$, $w_j$. $p_{w_i,w_j}$ is a link function or a probability function for a bigram $w_i$, $w_1$, defined as:

$$p(w_i, w_j) = \exp\{v_{w_j}^T v_{w_i} + a_{w_i,w_j}\} p(w_i) p(w_j) \quad (1)$$

Where $v_{w_j}^T v_{w_i}$ refers to the linear interactions between two word vectors and $a_{w_i,w_j}$ is a residual information representing nonlinear or noisy interactions between two words.

Equation (1) is actually the regularized pointwise mutual information between two word vectors. $t_k$ is the topic embedding for k-th topic and $\beta_r$ is a hyperparameter. The fourth step is similar to LDA. Nonetheless, the generative process for each word $w_{ij}$ is based on a link function $p(w_{ij}|w_{i,j-c}:w_{i,j-1},z_{ij},d_i)$ extended from equation (1), in which, an interaction function between the word vector and topic embedding is added. Corresponding to FIG. 1, the above generative process may be summarized as a likelihood function (or a topic loss function) for each document.

$$\mathcal{L}_{topic} = p(D, A, V, Z, T, \theta | \alpha, \mu) = \quad (2)$$

$$\prod_{i=1}^{N} p(v_{w_i}; \mu_i) \prod_{i,j=1}^{N,N} p(a_{w_i,w_j}; g(\tilde{p}(w_i, w_j))) g(\tilde{p}(w_i, w_j))$$

$$\prod_{k}^{K} \text{Unif}(\beta_\gamma) \prod_{d=1}^{M} p(\theta_d | \alpha) p(z_d | \theta_d) p(w_d | V, A, t_d, z_d)$$

where D, A, V, Z, T refer to a document set, the residual matrix, the word embedding matrix, the topic matrix and topic embedding matrix respectively. In addition, $p(v_{w_i}; \mu_i)$ and $p(a_{w_i,w_j}; g(\tilde{p}(w_i,w_j)))$ are the two Gaussian priors for generating the word co-occurrences. The second term $g(\tilde{p}(w_i,w_j))$ is a nonnegative monotonic transformation for $\tilde{p}(w_i,w_j)$, aiming at penalizing the residual $a_{w_i,w_j}$.

1.1 Embodiments for Optimization of $\text{TMSA}_{topic}$

In one or more embodiments, following conventions, the regularized maximum likelihood function of $L_{topic}$ is optimized. Based on the distributions from the generative process, the complete-data likelihood of a corpus D may be factorized as follows:

$$p(D, A, V, Z, T, \theta | \alpha, \mu, \gamma) = \quad (3)$$

$$\frac{1}{Z(\Theta), U_\gamma^K} \exp\left\{-\sum_{i,j=1}^{N,N} g(\tilde{p}(w_i, w_j)) \alpha_{w_i,w_j}^2 - \sum_{i=1}^{N} \mu_i \|v_{w_i}\|^2\right\}$$

$$\prod_{d=1}^{M} \left\{ \frac{\Gamma(\sum_{k=1}^{K} \alpha_k)}{\prod_{k=1}^{K} \Gamma(\alpha_k)} \prod_{j=1}^{K} \theta_{ij}^{\alpha_j - 1} \prod_{j=1}^{L_i} \left( \theta_{i,z_{i,j}} P(w_{ij}) \exp \right.\right.$$

$$\left.\left.\left\{ v_{w_{ij}}^T \sum_{l=j-c}^{j-1} (v_{w_{il}} + t_{z_{ij}}) + \sum_{l=j-c}^{j-1} \alpha_{w_{il}w_{ij}} + r_{i,z_{i,j}} \right\} \right) \right\}$$

In one or more embodiments, V in $p(v_{w_i}; \mu_i)$ may be initialized by the pretrained word embedding and updated in $\text{TMSA}_{word}$. Among them $$\frac{1}{Z(\Theta), U_\gamma^K}$$

is the normalized term and $\Theta$ refers to all relevant parameters. Similar to LDA, the variational inference algorithm is employed to update corresponding parameters. The last term in equation (3), $$P(w_{ij}) \exp\left\{ v_{w_{ij}}^T \sum_{l=j-c}^{j-1} (v_{w_{il}} + t_{z_{ij}}) + \sum_{l=j-c}^{j-1} \alpha_{w_{il}w_{ij}} + r_{i,z_{i,j}} \right\}$$

is the latent feature vector, $p(w_d|V,A,t_d,z_d)$. $w_d$ is the collective word matrix in each document d. The negative log-likelihood of the corpus factorizes topic-wise into factors $L_t$ for each topic. With $L_2$ regularization for topic t, this term may be expressed as:

$$L_{z_{ij}} = -\sum_{w \in W} \theta^{i,w}(t_{z_{ij}} w_{ij}) - \log\left(\sum_{w' \in W} \exp(t_{z_{ij}} w_{ij})\right) + \mu \|t_{z_{ij}}\|_2^2 \quad (4)$$

In one or more embodiments, the MAP (Maximum A Posteriori) estimate of topic vector $t_{z_{ij}}$ may be obtained by minimizing the regularized negative log-likelihood. The derivative with respect to the j-th element of the vector for topic $z_{ij}$ is:

$$\frac{\partial L_{z_{ij}}}{\partial t_{z_{ij}}} = -\sum_{w \in W} \theta^{z_{ij}} \left(w_{ij} - \sum_{l \in W} w_{lj} v_{w_{lj}} t_{z_{ij}}\right) \quad (5)$$

2. Embodiments of Sparse Autoencoder (SA) Sparsified with Topic Modeling

In one or more embodiments, to learn embeddings of words, a sparse autoencoder (SA) using self-reconstruction criterion is adopted. Autoencoder is an unsupervised feed-forward neural network that applies backpropagation by fitting the input using the reconstructed output. It is often used to handle high-dimensional features and pre-train deep learning models. Word embeddings may also be trained via autoencoder.

Figure 3:
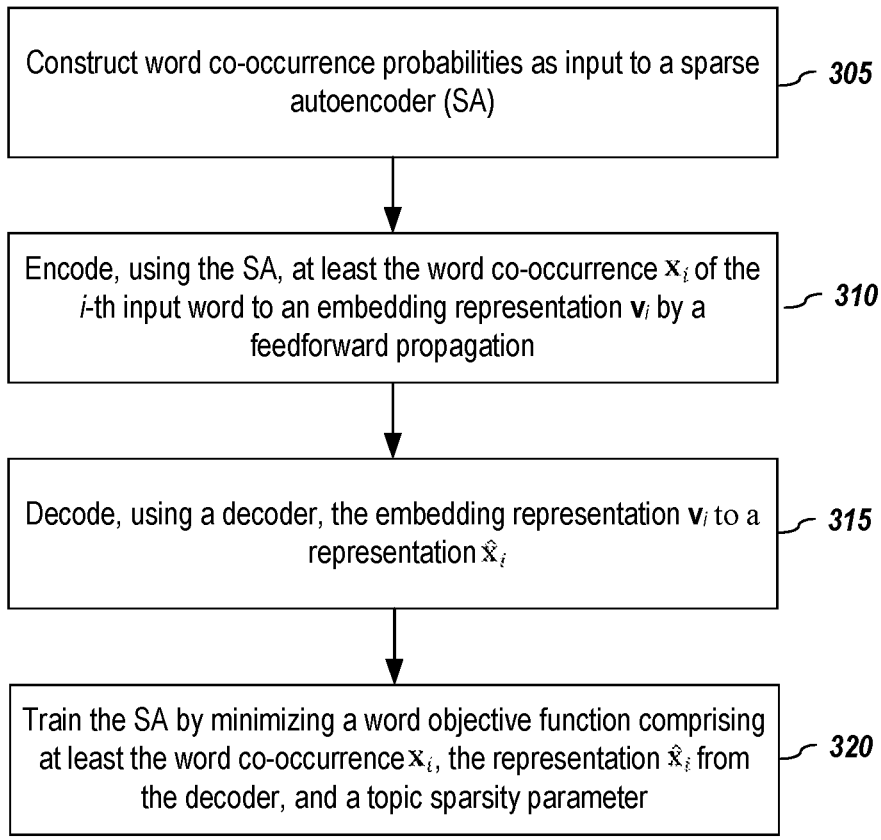
FIG. 3 depicts a method for generating word embedding using a sparse autoencoder (SA) sparsified with Topic modeling, according to one or more embodiments of the present disclosure.

FIG. 3 depicts a method for generating word embedding using an SA sparsified with Topic modeling, according to one or more embodiments of the present disclosure. In one or more embodiments, before training autoencoder for word embedding, the word co-occurrence probabilities is firstly constructed (305) by counting the number of times each context word occurs around its focus word divided by the frequency of the focus word. The square root of the probabilities, denoted as X, are considered as the input to the autoencoder.

With word co-occurrence information, SA encodes (310) at least the word co-occurrence $x_i$ of the i-th input word to an embedding representation $v_i \in \mathbb{R}^N$ by a feedforward propagation, $v_i = f(\Phi x_i + b)$. In one or more embodiments, the embedding representation $v_i$ is generated based on both the word co-occurrence $x_i$ and the topic assignment $z_i$ of the i-th input word.

$\Phi \in \mathbb{R}^{N \times S}$ is a weight matrix and $b \in \mathbb{R}^N$ is an embedding bias vector. $f(\bullet)$ is called the activation function, e.g., the sigmoid function $$f(x) = \frac{1}{1 + \exp(x)}.$$

After the feedforward pass, $v_i$ is decoded (315) back to a reconstructed representation $\hat{x}_i = f(\Phi^T v_i + c)$.

$c \in \mathbb{R}^N$ is a bias vector for the decoder. In one or more embodiments, a sparsity constraint is imposed on the embedding representation of $v_i$ to reduce noise in SA. The overall cost function of SA is $$\mathcal{L}_{SA}(\Phi, b) = \frac{1}{M} \sum_{i=1}^{N} \frac{1}{2} \|\hat{x}_i - x_i\|^2 + \frac{\lambda}{2} \|\Phi\|^2 + \xi \sum_{j=1}^{N} KL(\rho \| \hat{\rho}_j) \quad (6)$$

Where the first term is the average of reconstruction loss on all word co-occurrences with sum-of-squares. The second term is a regularization term to prevent over-fitting. $\lambda$ is the regularization parameter. The third term is the Kullback-Leibler (KL) divergence between two Bernoulli random variables with mean $\rho$ and $\hat{\rho}_j$, respectively. It aims to control the sparsity of the weight and bias parameters $\Phi$ and b. $\rho$ is the sparsity parameter that specifies the level of sparsity. $\xi$ is the weight of the sparsity term in the cost function.

$$KL(\rho \| \hat{\rho}_j) = \rho \log \frac{\rho}{\hat{\rho}_j} + (1 - \rho) \log \frac{1 - \rho}{1 - \hat{\rho}_j} \quad (7)$$

In one or more embodiments, equation (7) is used to penalize $\hat{\rho}_j$ deviating from the sparsity parameter $\rho$, with $$\hat{\rho}_j = \frac{1}{M} \sum_{i=1}^{N} v_{ij}$$

being the average activation of the j-th embedding representation. $v_{ij} \in v_i$ is the j-th embedding value for the i-th word. The word co-occurrences in SA encode the local context information only. In one or more embodiments in this patent document, global topical information is incorporated into the SA and $\text{TMSA}_{word}$, and the SA is sparsified with topic modeling to improve the word embeddings. In one or more embodiments, topical information is encapsulated into the overall cost function of SA such that the learned word embeddings also reflect the topic distributions of words. In order to achieve this goal, in one or more embodiments, a fourth term is added as a topic guidance term to train (320) the SA and $\text{TMSA}_{word}$ by minimizing the following objective function (or a word loss function):

$$L_{word}(\Phi, b) = \quad (8)$$
$$\frac{1}{M} \sum_{i=1}^{N} \frac{1}{2} \|\hat{x}_i - x_i\|^2 + \frac{\lambda}{2} \|\Phi\|^2 + \xi \sum_{j=1}^{N} KL(\rho \| \hat{\rho}_j) + \tau \sum_{k=1}^{K} KL(\varphi \| \hat{\varphi}_k)$$

Where $\varphi$ is the topic sparsity parameter for the embeddings and $\tau$ is the weight of the topic guidance term in the overall objective function $\hat{\varphi}_k$ is the average activation of the embeddings for the k-th topic:

$$\hat{\varphi}_k = \frac{1}{MD_t} \sum_{i=1}^{M} \sum_{j=1}^{D_t} \|h_{jk}^i\|^2 \quad (9)$$

Where $h_{jk}^i \in h_i \in \mathcal{N}^{N \times K}$ is the topic distribution of the j-th embedding value over the k-th topic for the i-th word. $h_i = v_i x_i^T z_i$ is the topic distribution for the embedding $v_i$ and $h_i \in H$, the total of $h_i$. The topic guidance term is designed to help the learned embeddings v reflect the global topical information of words. Here the KL divergence $KL(\varphi \| \hat{\varphi}_k)$ helps reconstruct the input with the activations that are related to the most discriminative topics.

3. Embodiments of TMSA Architecture

With the semantic word embedding information extracted from local contexts, topics from texts may be better discovered; and by exploiting the global topical information, topic-related information will be effectively reflected in word embeddings. These two processes interact closely with each other to boost the performance of both topic discovery and word embedding. In one or more embodiments, the overall objective function may be defined as:

$$\mathcal{L} = \underset{f}{\operatorname{argmin}}(\mathcal{L}_{topic} + \mathcal{L}_{word}) \quad (10)$$

Figure 4:
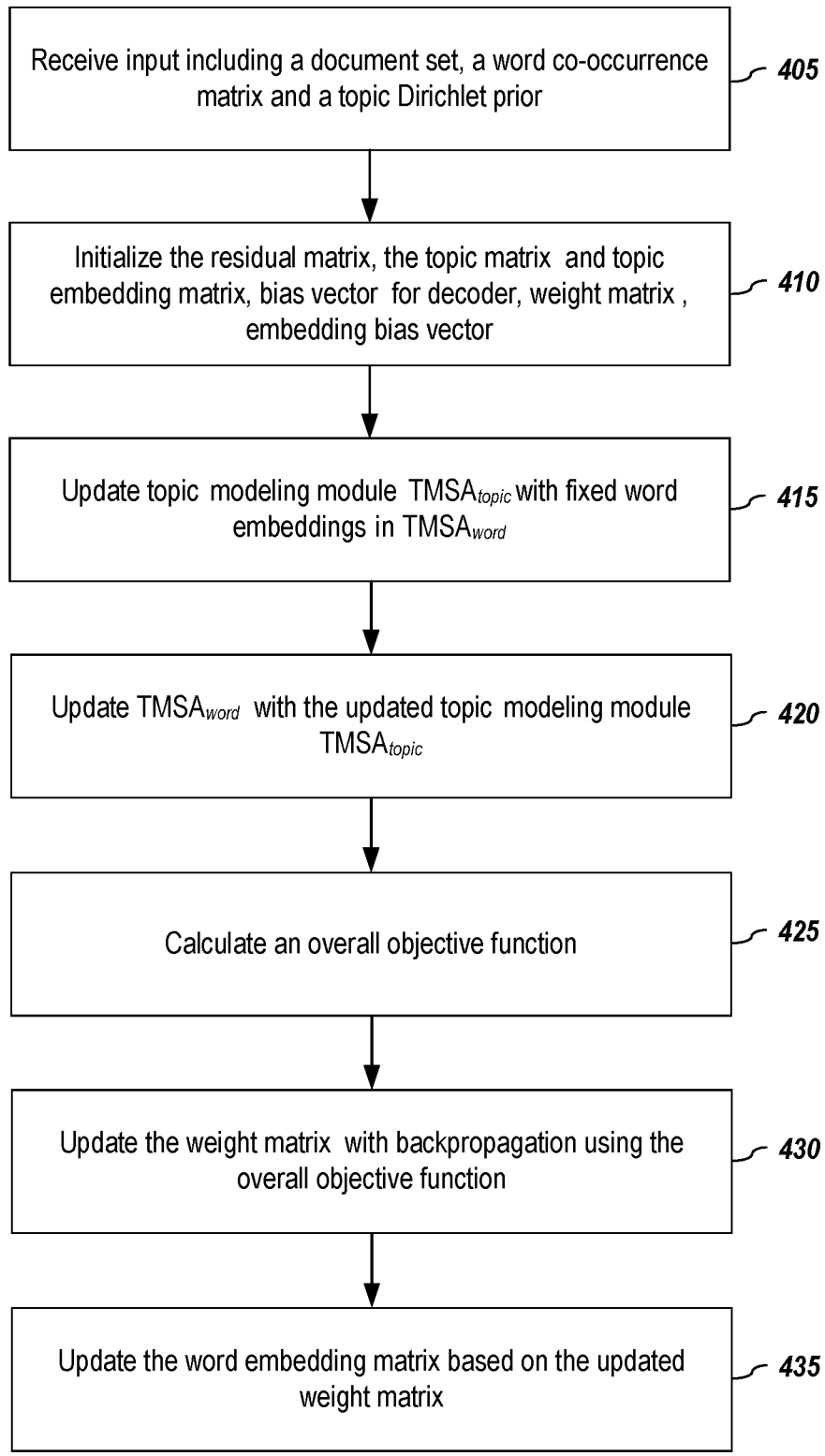
FIG. 4 depicts a method for mutual learning with TMSA for topic modeling and word embedding, according to one or more embodiments of the present disclosure.

In one or more embodiments, word embeddings in $TMSA_{word}$ is first fixed to update topic modeling $TMSA_{topic}$. With the updated topics, $TMSA_{word}$ is then run to learn better word embeddings. This iterative process continues until converge is achieved. The whole procedure is illustrated in Algorithm 1. The discloses TMSA framework embodiments have several advantages. Firstly, parameter tuning and inferences may be done in a unified framework. Secondly, the mechanism of back propagation in Sparse autoencoder may be utilized for fine tuning word embeddings. Thirdly, extra layers may be easily added to handle other tasks, such as adding a softmax layer for classifications. FIG. 4 depicts a method for mutual learning with TMSA for topic modeling and word embedding, according to one or more embodiments of the present disclosure. An exemplary complete mutual learning procedure is summarized in Methodology 1. Input includes a document set D, a word co-occurrence matrix X and a topic Dirichlet prior $\alpha$ are received (405). After initializing (410) the residual matrix A, the topic matrix Z and topic embedding matrix T, bias vector c for decoder, weight matrix $\Phi$, embedding bias vector b, word embeddings in $TMSA_{word}$ is first fixed to update (415) topic modeling $TMSA_{topic}$. $TMSA_{word}$ is then updated (420) with the updated topics to learn better word embeddings. An overall objective function as in Equation 10 is then calculated (425). The weight matrix $\Phi$ is updated (430) with backpropagation using the overall objective function. The word embedding matrix V is then updated (435) based on the updated weight matrix $\Phi$. Such updates are repeated until the topic difference is smaller than the pre-defined $\in$ or the given epoch number is reached.

Methodology 1 The mutual learning algorithm TMSA for topic modeling and word embedding

---

Input: D, X, $\alpha$
Initialization: Z, T, A, c, $\Phi$, b
while topic difference < $\epsilon$
or iteration < total epoch number
  /* topic modeling step: */
  1. update $\theta$ with $\alpha$ and T
  2. update Z with $\theta$
  3. update p ($w_d$) with T, A, V and Z
  4. calculate negative log-likelihood
  /* word encoder step: */
  5. encoder X
  6. update $\Phi$ and c
  7. calculate H
  8. update $\hat{\rho}$ with $\Phi$ and c
  9. update $\varphi$ with H
  10. calculate loss function in equation (10)
  11. update $\Phi$ with backpropagation
  12. update V with $\Phi$
end while

---

E. SOME EXPERIMENTS

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, the effectiveness of tested embodiments of the TMSA framework from both the topic discovery task and the word embedding task are evaluated.

1. Embodiments of Datasets

In this section, two datasets are utilized for the evaluations. One is the 20 Newsgroups and the other one is the Reuters-21578 corpus. The two corpora are referred to as the 20News and Reuters in the following. 20News has 11,311 documents for training and 7,529 for testing. It has 20 different categories. For Reuters, the largest 10 categories are selected for the experiment with 5,770 documents for training and 2,255 for testing. During the data processing step, stop words are removed and all words are converted to lowercase. For the construction of the word co-occurrence matrix for word embedding, the context window size is set as 10. For the topic modeling, the predefined topic difference E and the topic Dirichlet prior $\alpha$ is set to 0.01 and 0.1, respectively. The total epoch number is set to 100. For the parameters of sparse autoencoder, the sparsity level $\xi$ and topic guidance weight $\tau$ are both set as 0.1. The sparsity parameter $\rho$ and the topic sparsity parameter $\eta$ are both set as 0.05. The regularization parameter $\lambda$ is 0.01. The number of topics are 20 and 10 for 20News and Reuters, respectively. The embedding dimension is set to 50.

2. Embodiments of Evaluation on Document Classification

In one or more experiments, evaluation of how TMSA embodiments may benefit downstream applications has been implemented first. The evaluation focuses on the document classification task and TMSA embodiments are compared with the following topic modeling baselines:

LDA: the vanilla Latent Dirichlet Allocation;
  LFTM: the Latent Feature Topic Modeling;
  TopicVec: the generative topic embedding method;
  CLM: the Collaborative Language Model In addition to the above baselines, TMSA embodiments are also compare with the state-of-the-art methods that use the learned word representations for document classification. The methods are:

PV-DBOW and PV-DM[1]: the Doc2Vec model;
  MeanWV[2]: the mean word embedding of the TopicVec model;
  TWE[3]: the Topical Word Embedding method;
  Gaussian LDA[4]: the Gaussian LDA model;
  TV+MeanWV[2]: the concatenation of TopicVec and MeanWV.

[1] Quoc V. Le et al., Distributed representations of sentences and documents. In *Proceedings of the 31st International Conference on Machine Learning, ICML* 2014, Beijing, China, 21-26 Jun. 2014, pages 1188-1196, 2014.

[2] Shaohua Li, et al., Generative topic embedding: a continuous representation of documents. In *Proceedings of the 54th Annual Meeting of the Association for Computational Linguistics, ACL* 2016, Aug. 7-12, 2016, Berlin, Germany, Volume 1: *Long Papers,* 2016

[3] Yang Liu, et al., Topical word embeddings. In *Proceedings of the 29th AAAI Conference on Artificial Intelligence,* Jan. 25-30, 2015, Austin, Tex., USA, pages 2418-2424, 2015

[4] Rajarshi Das, et al., Gaussian LDA for topic models with word embeddings. In *Proceedings of the 53rd Annual Meeting of the Association for Computational Linguistics and the 7th International Joint Conference on Natural Language Processing of the Asian Federation of Natural Language Processing, ACL* 2015, Jul. 26-31.

In TWE, Gaussian LDA and TV+MeanWV, both topic representations and word embeddings of a document are concatenated as features for classification. In one or more TMSA embodiments, the word embeddings are aggregated and the mean is used as document features since the topical information has already been incorporated into the learned word embeddings. In the experiment, the macro-average precision, recall and F1 measures are used as the evaluation metrics. For LDA, LFTM, CLM PV-DBOW, PV-DM, TWE and Gaussian-LDA, the same results reported in CLM are used. For TopicVec, MeanWV and TV+MeanWV, the same results from TV+MeanWV[5] are reported.

The performance on 20News and Reuters are shown in Table 1 and Table 2, respectively. The best results are highlighted in boldface. It is observed that TMSA outperforms the compared methods significantly on both datasets. Compared to the second best method CLM, TMSA achieves 2.5% and 4.3% higher on Fscore for 20News and Reuters, respectively. As mentioned by Bei Shi, et al. (Jointly learning word embeddings and latent topics. In *Proceedings of the 40th International ACM SIGIR Conference on Research and Development in Information Retrieval*, Shinjuku, Tokyo, Japan, Aug. 7-11, 2017, pages 375-384, 2017), STE is proposed to learn topic-specific word embeddings to avoid the issue of polysemy. It is reported that STE achieves 82.5% of precision, 82.3% of recall and 82.5% of Fscore on 20News. There is no available result of STE on Reuters. It can be seen that the TMSA embodiment still outperform STE on 20News. In summary, the TMSA embodiment combines the topic modeling and word embedding components via a mutual learning mechanism and achieves the best performance on both datasets.

TABLE 1

Document classification on the 20News dataset
(The best results are highlighted in bold)

|  | Precision | Recall | Fscore |
| --- | --- | --- | --- |
| LDA | 72.7% | 72.2% | 71.9% |
| LFTM | 71.6% | 71.4% | 70.9% |
| TopicVec | 71.3% | 71.3% | 71.2% |
| CLM | 82.5% | 81.8% | 81.6% |
| PV-DBOW | 51.0% | 49.1% | 45.9% |
| PV-DM | 42.8% | 38.6% | 36.1% |
| MeanWV | 70.4% | 70.3% | 70.1% |
| TWE | 52.5% | 46.6% | 43.7% |
| Gaussian-LDA | 30.9% | 26.5% | 22.7% |
| TV + MeanWV | 71.8% | 71.5% | 71.6% |
| TMSA | 85.7% | 83.7% | 84.1% |

TABLE 2

Document classification on Reuters dataset

|  | Precision | Recall | Fscore |
| --- | --- | --- | --- |
| LDA | 88.8% | 87.0% | 87.9% |
| LFTM | 89.3% | 59.1% | 66.1% |
| TopicVec | 92.5% | 92.1% | 92.2% |
| CLM | 94.4% | 91.6% | 92.9% |
| PV-DBOW | 75.5% | 50.5% | 54.9% |
| PV-DM | 68.1% | 43.4% | 50.7% |
| MeanWV | 92.0% | 89.6% | 90.5% |
| TWE | 79.4% | 51.2% | 62.6% |
| Gaussian-LDA | 46.2% | 31.5% | 35.3% |
| TV + MeanWV | 92.2% | 91.6% | 91.6% |
| TMSA | 97.3% | 97.2% | 97.2% |

3. Embodiments of Evaluation on Word Similarity

In one or more embodiments, the quality of word embedding learned from 20News is evaluated, to illustrate the effectiveness of the proposed TMSA framework. Since 20News is a small corpus compared with the largest online encyclopedia Wikipedia, it is challenging to collect a large amount of local context information. By encoding the global topical information into the sparse autoencoder with local contexts as a kind of complementary information, embodiments of TMSA may improve the word representation learning process significantly even for small corpora.

In this section, embodiments of TMSA are compare with several word embedding baselines, including Skip-Gram and CBOW, GloVe (Jeffrey Pennington et al., Glove: Global vectors for word representation. In *Proceedings of the 2014 conference on empirical methods in natural language processing (EMNLP)*, pages 1532-1543, 2014), SPPMI and SPPMI+SVD (Omer Levy, et al., Neural word embedding as implicit matrix factorization. In *Advances in Neural Information Processing Systems 27: Annual Conference on Neural Information Processing Systems 2014*, Dec. 8-13, 2014, Montreal, Quebec, Canada, pages 2177-2185, 2014), PV-DBOW and PV-DM, TWE and CLM. In one or more embodiments, word embeddings learned from all these methods are used to evaluate the word pair similarities on several datasets. These datasets include WordSim353 (WS353) (Fabrice Souvannavong, et al., Improved video content indexing by multiple latent semantic analysis. In *Image and Video Retrieval: Third International Conference, CIVR 2004*, Dublin, Ireland, Jul. 21-23, 2004), WordSim Relatedness (WS Rel) (Eneko Agirre et al., A study on similarity and relatedness using distributional and wordnet-based approaches. In *Human Language Technologies: Conference of the North American Chapter of the Association of Computational Linguistics, Proceedings*, May 31-Jun. 5, 2009), Turk (Kira Radinsky et al., A word at a time: computing word relatedness using temporal semantic analysis. In *Proceedings of the 20th International Conference on World Wide Web, WWW 2011*, Hyderabad, India, Mar. 28-Apr. 1, 2011), simLex-999 (Felix Hill, et al., Simlex-999: Evaluating semantic models with (genuine) similarity estimation. *Computational Linguistics*, 41(4):665-695, 2015) and Rare (Tomas Mikolov et al., Distributed representations of words and phrases and their compositionality. In *Advances in Neural Information Processing Systems 26: 27th Annual Conference on Neural Information Processing Systems 2013. Proceedings of a meeting held Dec. 5-8, 2013*, Lake Tahoe, Nev., United States, pages 3111-3119, 2013). In one or more embodiments, the performance of word embeddings is tested by measuring the Spearman's correlation of the cosine similarities of word embeddings and the human-assigned similarities. Code for the word similarity evaluation is run to measure the performance of embodiments of TMSA model on the task of word similarity. For all the baseline methods, the results from CLM are reported.

TABLE 3

Comparison of word similarity results

|  | WS353 | WS Rel | Turk | SimLex-999 | Rare |
| --- | --- | --- | --- | --- | --- |
| SPPMI | 0.461 | 0.444 | 0.551 | 0.131 | 0.245 |
| SPPMI + SVD | 0.451 | 0.435 | 0.489 | 0.166 | 0.349 |
| GloVe | 0.300 | 0.279 | 0.268 | 0.049 | 0.230 |
| Skim-Gram | 0.492 | 0.479 | 0.512 | 0.155 | 0.407 |
| CBOW | 0.488 | 0.451 | 0.529 | 0.151 | 0.407 |
| PV-DBOW | 0.477 | 0.442 | 0.488 | 0.139 | 0.285 |
| PV-DM | 0.297 | 0.304 | 0.339 | 0.013 | 0.157 |
| TWE | 0.317 | 0.231 | 0.260 | 0.084 | 0.184 |
| CLM | 0.526 | 0.486 | 0.525 | 0.189 | 0.411 |
| TMSA | 0.551 | 0.531 | 0.586 | 0.261 | 0.591 |

Table 3 shows the results of word similarities. Higher values indicate that the learned embeddings are closer to the human judgments on the word similarity task. It is observed that the evaluated TMSA embodiments outperform all baseline methods on all datasets. Although CLM also performs well on these datasets, it does not beat TMSA as it does not encode the topical information explicitly into the word representation learning process.

4. Embodiments of Qualitative Analysis

In this section, two case studies are presented to show the quality of generated topics and word embeddings as well as the correlations between them.

4.1 Embodiments for Qualitative Assessment of Topic Modeling

This subsection provides examples of how embodiments of TMSA framework improve topic coherence. Table 4 compares the top words produced by TopicVec, one of the state-of-the-art method for topic discovery, and TMSA embodiment for four topics. In Table 4, for Topic 1 both TopicVec and the TMSA embodiment produce words which share clear and similar themes (religion for Topic 1). But for Topic 2, Topic 3 and Topic 4, TMSA finds more meaningful words than TopicVec. In TMSA, Topic 2 is about email communications, Topic 3 is language related and Topic 4 is more related to industries. In contrast, TopicVec discovers fewer meaningful words related to these three topics. The words in TopicVec are not that coherent. This shows that TMSA has more powerful capacity of generating topics with interpretable themes.

3CosAdd value in a descending order. The last column is the optimized 3CosAdd value for each word analogy question. It is observed that TMSA embodiments not only discover the syntactic analogies such as "flying is to flew as playing is to played", but also find the semantic analogies such as "husband is to wife as father is to mother".

Figure 5:
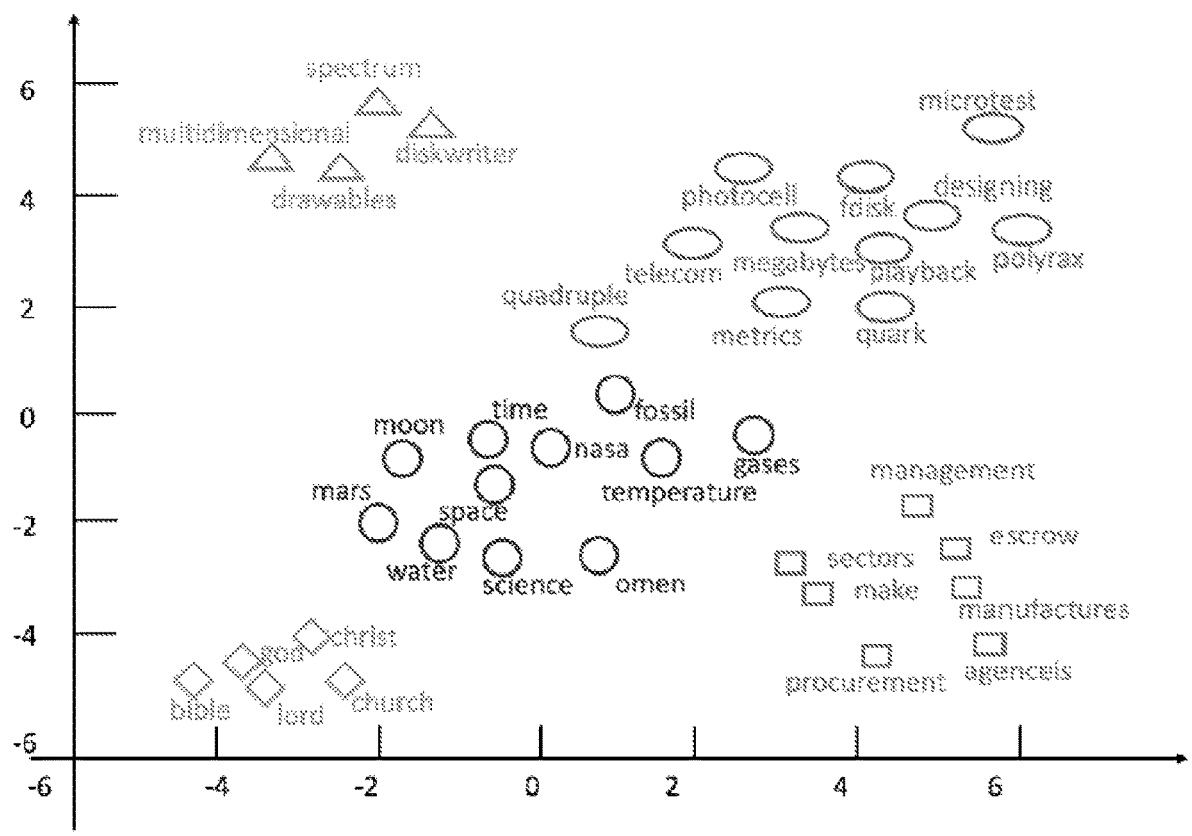
FIG. 5 graphically depicts a two-dimensional PCA projection of word embedding clusters, according to one or more embodiments of the present disclosure.

In addition to examples of word analogy, a figure of a two-dimensional PCA projection of word embedding clusters is also presented in FIG. 5, according to one or more embodiments of the present disclosure. Words having higher scores than a threshold are selected to represent a cluster of related word embeddings. Five clusters (represented as different shapes) with distinct themes can be observed, roughly as, religion, manufacturing, astronomy, computer-related and electronic. Further, the locations of those five themes in the embedding space are not random either. Computer-related and electronic are closer and located on the above while manufacturing, religion and astronomy are closer and located on the below. Those word embedding clusters are evidently affected or guided by the topic words generated from $TMSA_{topic}$. Similar words may be observed from topics generated in $TMSA_{topic}$ in Table 4. Topic 1 and Topic 4 correspond to religion and manufacturing respectively. In addition, topics about space sciences, astronomy and computers can be observed in the output of $TMSA_{topic}$ too. It shows that the mutual learning is working effectively in the TMSA embodiments.

TABLE 4

Comparisons of topics generated between TopicVec and TMSA, with the most relevant words for four topics

| Topic | Method | Word | | | | | |
|---|---|---|---|---|---|---|---|
| Topic 1 | TopicVec | God | Jesus | Bible | Christ | Christian | Church |
| | TMSA | God | Jesus | Christian | Religion | Truth | Faith |
| Topic 2 | TopicVec | Email | Trash | Address | Sell | Send | Geek |
| | TMSA | Email | Shipping | Address | Reply | Send | Mail |
| Topic 3 | TopicVec | Dictionary | Lemieux | Language | gainey | Nyr | Det |
| | TMSA | Thesaurus | Grammar | Encyclopedia | Dictionaries | Idioms | Synonyms |
| Topic 4 | TopicVec | Sectors | Clair | Garden | Eau | Ashland | Unmarked |
| | TMSA | Procurement | Manufactures | Agencies | Sector | Escrow | Management |

4.2 Embodiments of Qualitative Assessment of Word Embedding

In this section, word embeddings are qualitatively assessed from two perspectives. First, the performance of word embeddings is tested on the task of word analogy. Word analogy aims at measuring whether word embedding can cluster word/phrase pairs of similar relations together. Given four words "a", "b", "c" and "d", the usual format for such analogy is "a is to b" as "c is to d", where "d" is hidden and needs to be inferred from the vocabulary. "d" can be inferred by optimizing 3CosAdd (Omer Levy et al., Linguistic regularities in sparse and explicit word representations. In *Proceedings of the Eighteenth Conference on Computational Natural Language Learning, CoNLL* 2014, Baltimore, Md., USA, Jun. 26-27, 2014, pages 171-180, 2014) as $\mathrm{argmin}_{d \in V}(\cos(d, c-a+b))$. In this subsection, the quality of the word embeddings learned from TMSA embodiments on 20News is tested using a dataset containing syntactic analogies such as "good is to better as rich is to richer" and semantic analogies such as "king is to queen as man is to woman".

Table 5 shows the top five analogies for the word analogy task discovered from 20News by ranking the optimized

TABLE 5

Examples from 20News for word analogy.
The top 5 word pairs are shown.

| | (a, b) | (c, d) | 3CosAdd |
|---|---|---|---|
| 1 | (Stockholm, Sweden) | (Helsinki, Finland) | 0.978 |
| 2 | (scream, screaming) | (listen, listening) | 0.972 |
| 3 | (jumping, jumped) | (playing, played) | 0.970 |
| 4 | (flying, flew) | (playing, played) | 0.965 |
| 5 | (husband, wife) | (father, mother) | 0.964 |

F. SOME CONCLUSIONS

In this patent document, embodiments of a mutual learning model TMSA for global topic discovery and local word embedding are disclosed. In one or more TMSA embodiments, the topic discovery component $TMSA_{topic}$ learns topics for input word co-occurrence. The learned word topics are then passed to $TMSA_{word}$ to add topic sparsity to enhance the construction of count-based word embedding. In return, word embeddings are passed back to $TMSA_{topic}$ to improve topic discovery. Experimental results show that both topics and word embeddings demonstrate better performances.

In one or more embodiments, the TMSA embodiments may be extended in various scenarios. TMSA embodiments may be extended through theoretical studies to optimize integration between autoencoder, topic modeling and word embedding. For example, besides the parametric model based on LDA, non-parametric model, such as hierarchical Dirichlet process, may also be considered. Secondly, topics of documents and embeddings may be jointly learned to help boost the document classification performance. Embodiments of TMSA may include integration of knowledge graph into topic modeling. Through the joint learning process, additional discoveries may be identified on the associations between topic generations, word representation learning and knowledge graph embedding.

G. SYSTEM EMBODIMENTS

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
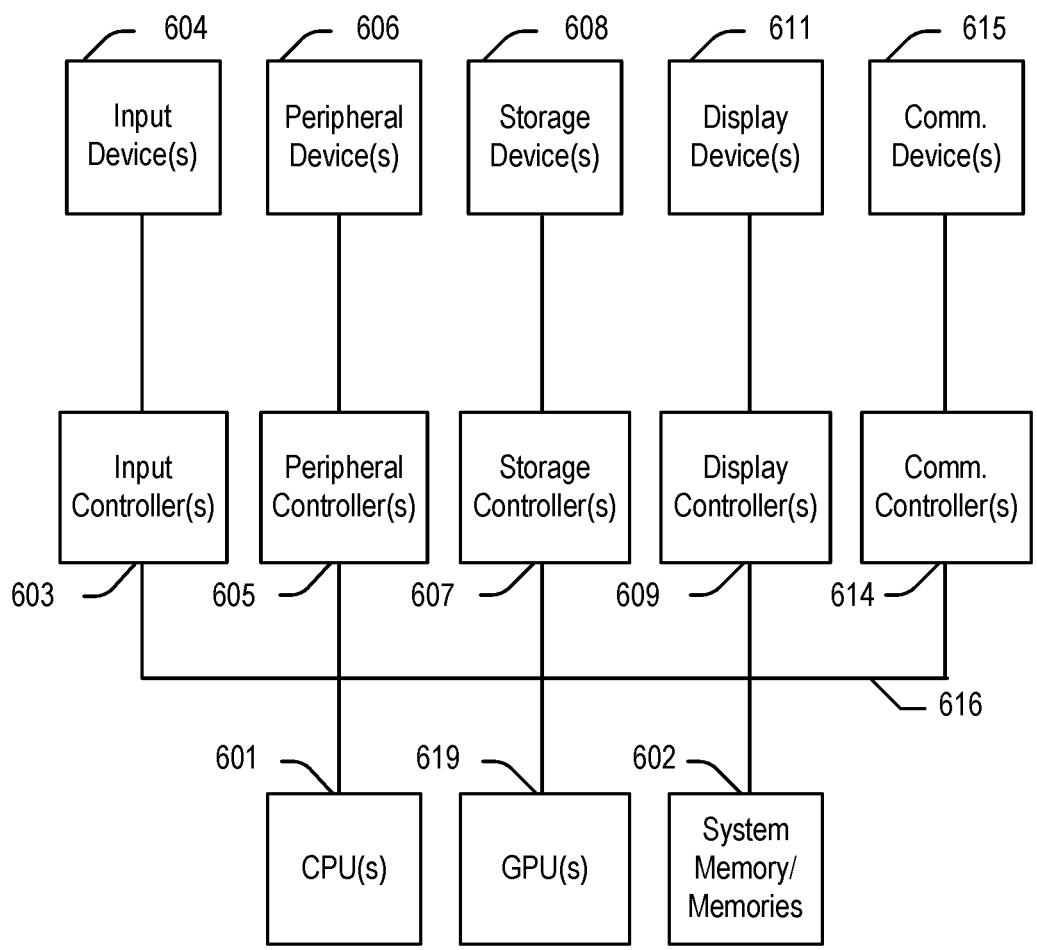
FIG. 6 depicts a simplified block diagram of a computing device/information handling system, in accordance with one or more embodiments of the present document.

FIG. 6 depicts a simplified block diagram of a computing device/information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present invention. Storage device(s) 608 may also be used to store processed data or data to be processed in accordance with the invention. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for mutual learning with topic discovery and word embedding using one or more processors to cause steps to be performed comprising:
   receiving input comprising a Dirichlet prior and a document set having at least one document;
   for each word in a set of words from the document set:
      drawing, from a word embedding matrix, a word embedding for the word, the word embedding matrix is updated using an autoencoder sparsified with topics to reflect topic distribution of words, the autoencoder is trained using a word cost function that comprises a sparsity term comprising a first Kullback-Leibler (KL) divergence involving a sparsity parameter and a topic guidance term comprising a second KL divergence involving a topic sparsity parameter, the topic guidance term uses topic distributions of words in the document set to update word embeddings in the word embedding matrix;
      drawing, from a residual matrix, residuals for each word co-occurrence corresponding to the word, each residual presenting nonlinear or noisy interaction between the word and another word in each document; and
      drawing, from a topic embedding matrix, one or more topic embeddings corresponding to the word;
   for each document in the document set:
      drawing, from the Dirichlet prior, a mixing topic proportion representing relative proportions among topics for each document;
      drawing at least one topic from a topic matrix for a j-th word in each document based on the mixing topic proportion, j is a positive integer number; and
      drawing a word from a vocabulary according to a probability of the word given the at least one topic drawn from the topic matrix;
   updating one or more topic representations by optimizing a likelihood function for topic, the likelihood function for topic is a function of the document set, the topic matrix, the residual matrix, the word embedding matrix, and the topic embedding matrix; and
   outputting the updated word embedding matrix and the one or more updated topic representations.

2. The computer-implemented method of claim 1 wherein the word embedding matrix is initialized by pretrained word embeddings.

3. The computer-implemented method of claim 1 further comprising:
   using the updated word embedding matrix and the one or more updated topic representations for document classification.

4. The computer-implemented method of claim 1 wherein the autoencoder is a sparse autoencoder.

5. The computer-implemented method of claim 4 wherein the word embedding in the word embedding matrix is generated, using the sparse autoencoder, by encoding word co-occurrence probabilities of the word with a feedforward propagation, the word co-occurrence probabilities are obtained by counting a number of times each context word occurs around its focus word divided by a frequency of the focus word.

6. The computer-implemented method of claim 5 wherein the word embedding matrix is initialized by pre-trained word embeddings.

7. The computer-implemented method of claim 4 wherein the second KL divergence is between the topic sparsity parameter for a topic and an average activation of the embeddings for the topic.

8. A computer-implemented method for generating word embedding using one or more processors to cause steps to be performed comprising:
   receiving input comprising a Dirichlet prior and a document set having at least one document; and
   for each document:
      constructing a word co-occurrence matrix comprising a plurality of word co-occurrences probabilities respectively corresponding to a plurality of word-pairs;
      encoding, using a sparse autoencoder sparsified with topic information, at least word co-occurrence of each input word in each document to a word embedding representation by a feedforward propagation;
      decoding, using the sparse autoencoder, the embedding representation of the input word back to a reconstructed representation; and
      training the sparse autoencoder to update the word embeddings by minimizing a word loss function that comprises a sparsity term comprising a first Kullback-Leibler (KL) divergence involving a sparsity parameter and a topic guidance term comprising a second KL divergence involving a topic sparsity parameter, the topic guidance term uses topic distribution of words to encapsulate topic information such that the updated word embeddings reflect topic distribution of words.

9. The computer-implemented method of claim 8 wherein the updated word embeddings are used for document classification.

10. The computer-implemented method of claim 9 wherein the second KL divergence is between the topic sparsity parameter for a topic and an average activation of the embeddings for the topic.

11. The computer-implemented method of claim 8 wherein the word co-occurrence matrix is extracted from a sequence of words in each document of the document set within a text window.

12. The computer-implemented method of claim 11 wherein the text window is fixed and remains the same across documents.

13. The computer-implemented method of claim 11 wherein each word sequence has a focus word and its neighboring context words within a text window centered at the focus word.

14. The computer-implemented method of claim 8 wherein the topic information is updated using the updated word embeddings.

15. The computer-implemented method of claim 8 wherein the topic information is drawn from a topic matrix based on a mixing topic proportion, the mixing topic proportion is generated from the Dirichlet prior.

16. A computer-implemented method for mutual learning with topic discovery and word embedding using one or more processors to cause steps to be performed comprising:
   receiving input comprising a Dirichlet prior, a word co-occurrence matrix, and a document set having at least one document;
   initializing at least a topic matrix, a topic embedding matrix, a residual matrix, a weight matrix for a sparsified autoencoder;
   generating a mixing topic proportion representing relative proportions among topics based on the Dirichlet prior and the topic embedding matrix;
   with the word embedding matrix fixed, updating topics in the topic matrix based on at least the mixing topic proportion;
   encoding, using the sparsified autoencoder sparsified with the updated topics, word co-occurrences in the word co-occurrence matrix to corresponding word embeddings by a feedforward propagation;
   training the sparsified autoencoder using an overall objective function combined from a topic loss function and a word loss function, the word loss function comprises a sparsity term comprising a first Kullback-Leibler (KL) divergence involving a sparsity parameter and a topic guidance term comprising a second KL divergence involving a topic sparsity parameter, the topic guidance term uses topic distributions of words in the document set to update word embeddings in the word embedding matrix;
   updating the weight matrix for the sparsified autoencoder with backpropagation; and
   updating the word embedding matrix using the sparsified autoencoder with the updated the weight matrix.

17. The computer-implemented method of claim 16 wherein the topic loss function is a likelihood function of the document set, the topic matrix, the residual matrix, the word embedding matrix, and the topic embedding matrix.

18. The computer-implemented method of claim 16 wherein the second KL divergence is between the topic sparsity parameter and an average activation of topic embeddings.

19. The computer-implemented method of claim 16 further comprising:
   decoding, using the sparsified autoencoder, an embedding representation of an input word back to a reconstructed representation.

20. The computer-implemented method of claim 16 further comprising:
   using the updated topics and the updated word embedding matrix for document classification.

* * * * *